Oct. 11, 1955  J. R. BOYLE  2,720,085
THERMAL RESERVE WATER COOLING SYSTEMS AND APPARATUS
Filed March 30, 1950  4 Sheets-Sheet 1
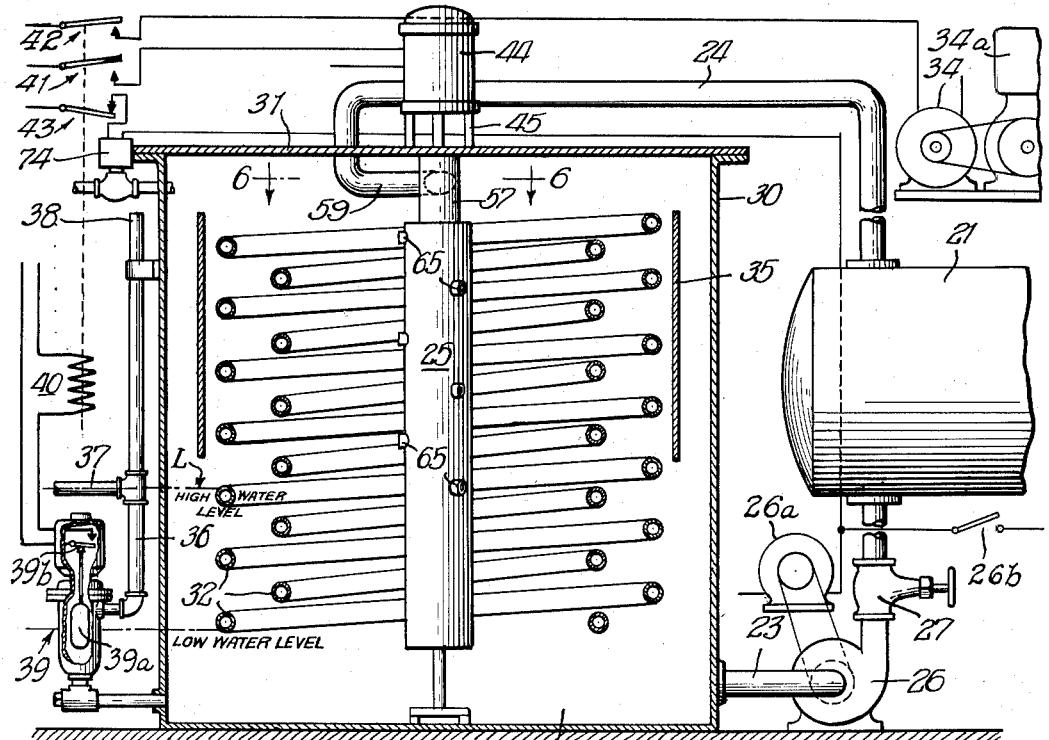
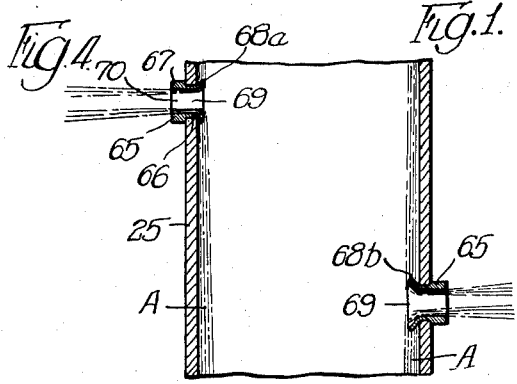
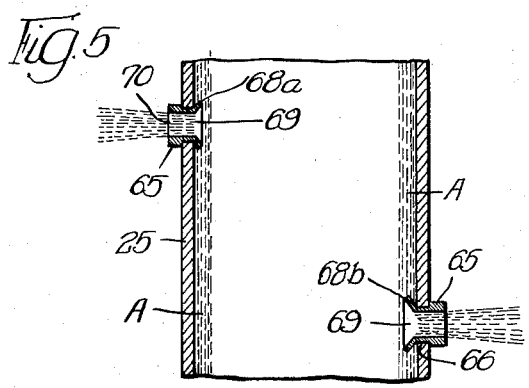
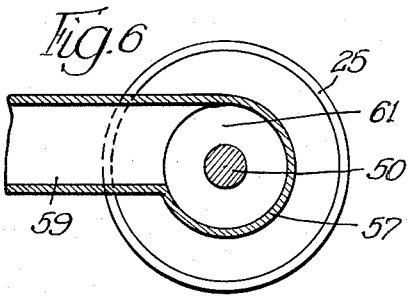
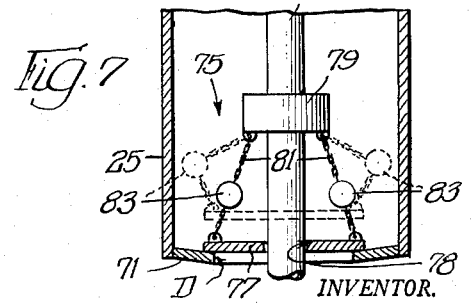
INVENTOR.
John R. Boyle,
BY Brown, Jackson,
Boettcher & Dienner
Attys

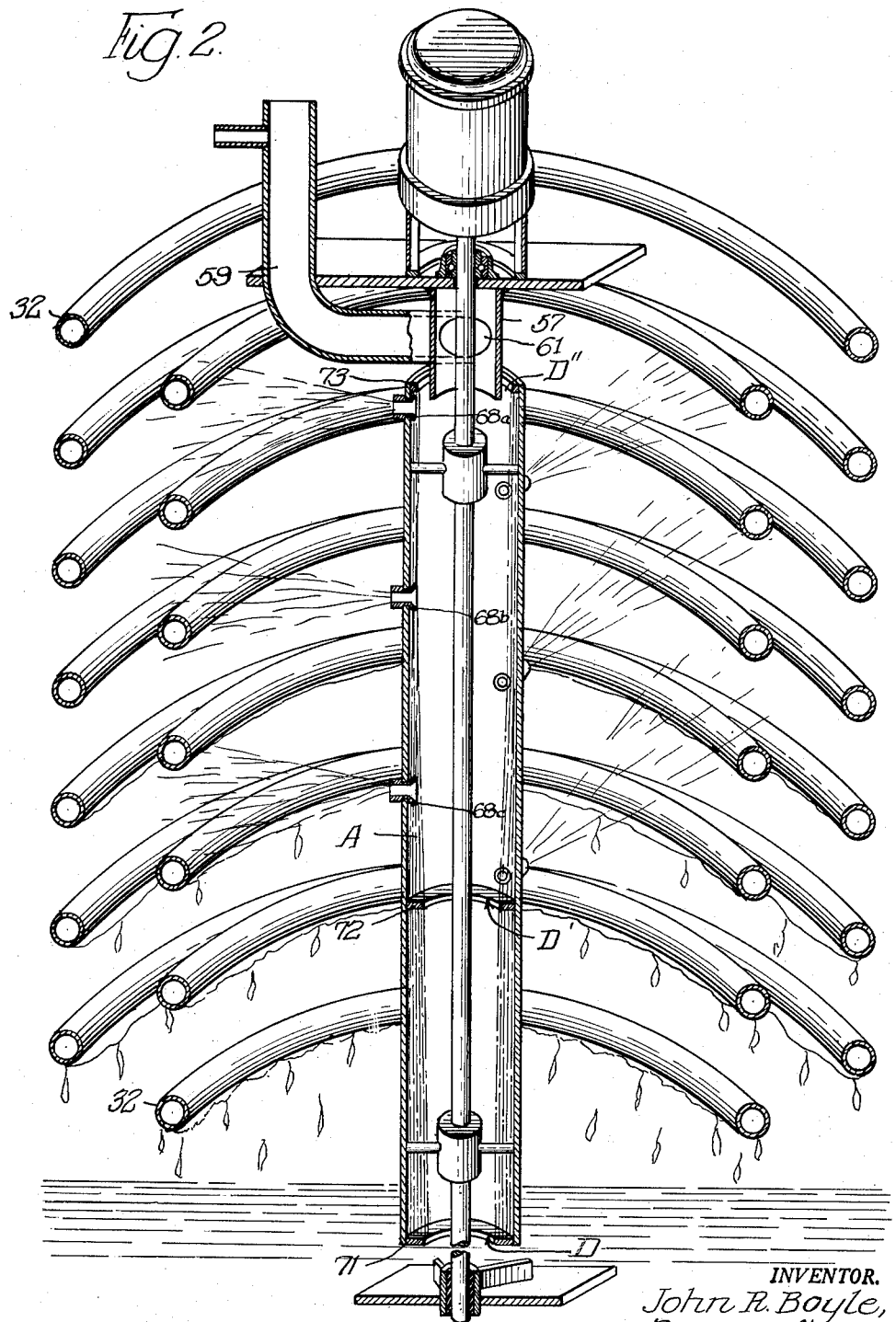

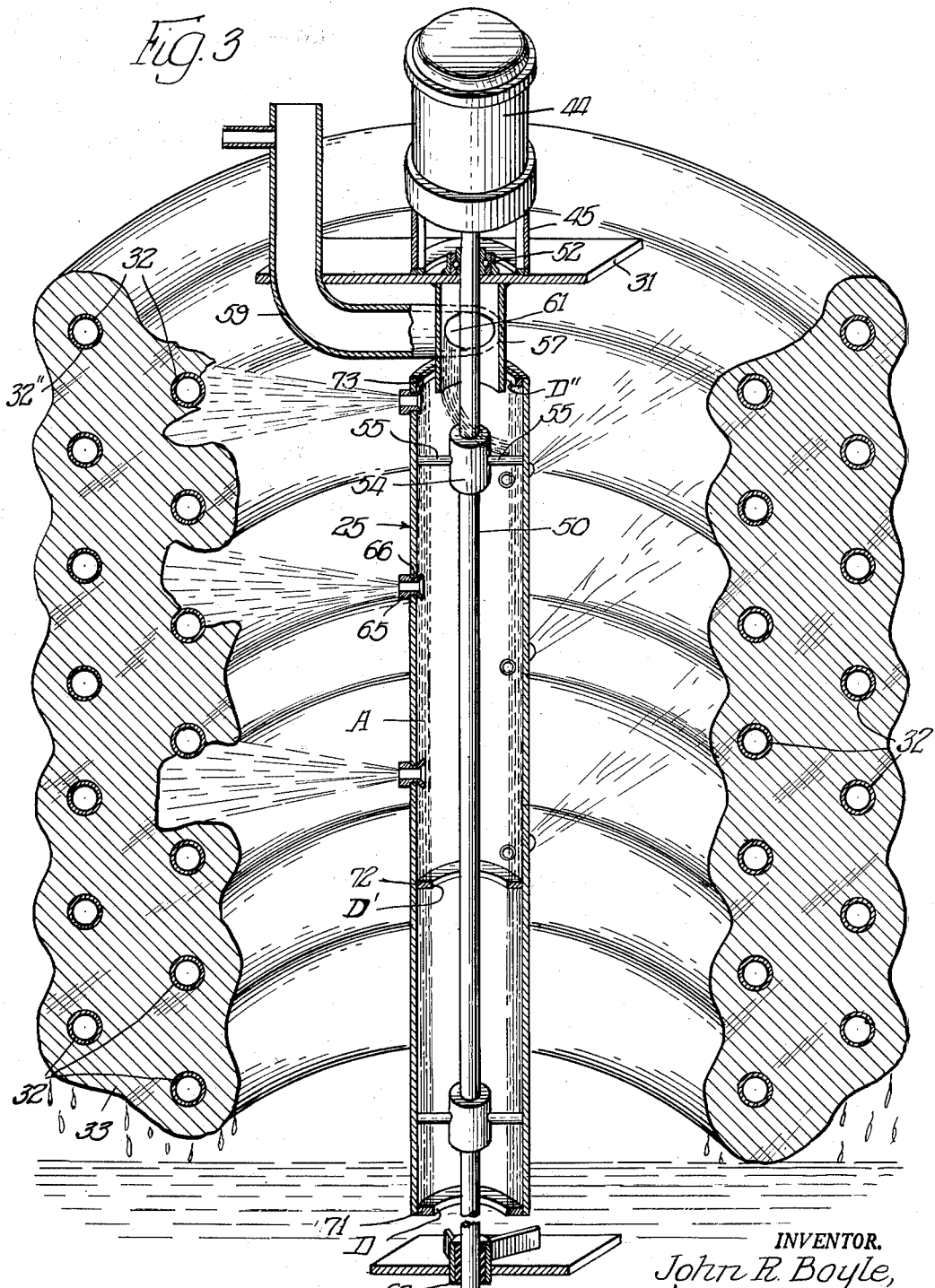

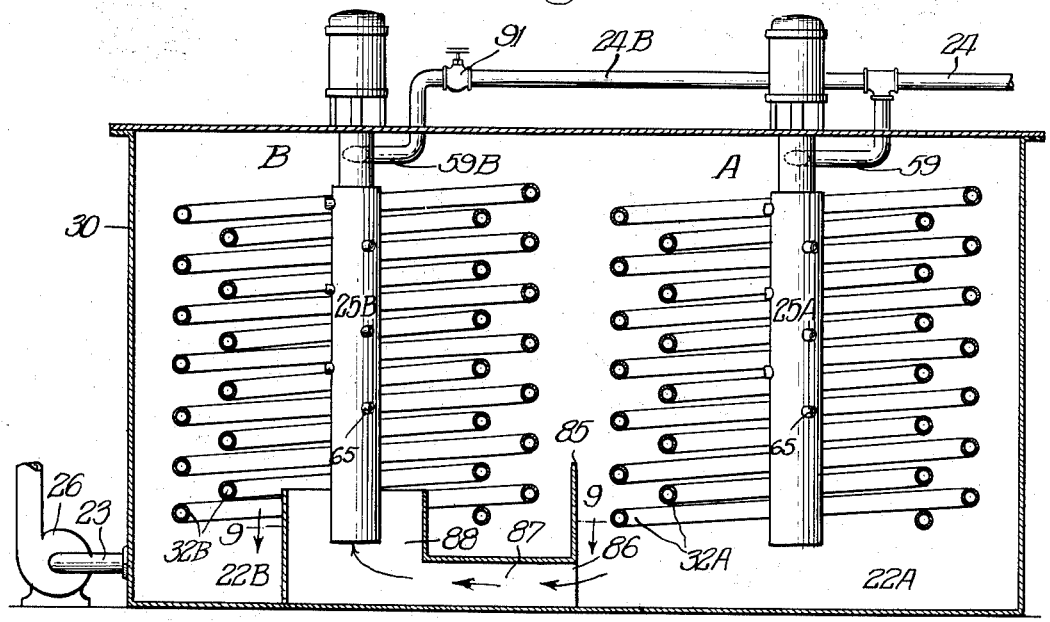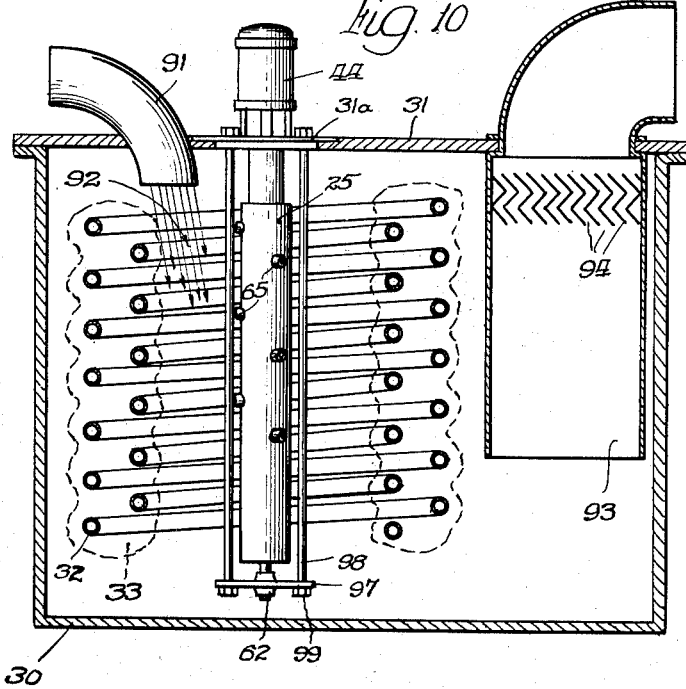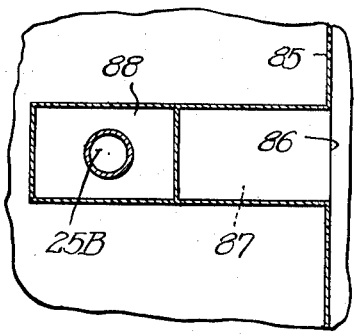

United States Patent Office 2,720,085
Patented Oct. 11, 1955

2,720,085

THERMAL RESERVE WATER COOLING SYSTEMS AND APPARATUS

John R. Boyle, Chicago, Ill., assignor to Edward A. Mertes, Chicago, Ill.

Application March 30, 1950, Serial No. 152,784

18 Claims. (Cl. 62—4)

The present invention relates to thermal reserve water cooling systems and apparatus.

In its preferred embodiment, the invention has particular application to cooling situations demanding a high peak load of cooling of relatively short duration occurring at spaced intervals, say once or twice a day. Such situations are exemplified by dairies, large dairy farms, creameries and the like where the operations of cooling milk or cream require an extremely large cooling capacity for a relatively short interval of time, say of one or two hours duration, occurring only once or twice a day. In the absence of any provision for thermal reserve, these prior cooling systems require a large size refrigeration plant capable of instantaneously meeting this peak load demand for the one or two hours of operation, following which the refrigerating plant remains in a stand-by or idling condition during the several hours between cooling operations. This entails an expensive investment and an inefficient system, considered over the entire day's interval. These peak loads of short duration are also encountered in the air conditioning systems of theaters, buildings and the like, and in some industrial situations requiring a cyclical cooling operation of short duration, such as in cooling water for beverage manufacture.

The general objects of the present invention are to provide an improved system and apparatus adapted: (1) to storage a large refrigerating effect in the form of ice; (2) to make ice slowly with a small refrigerating system; and (3) to melt the ice very rapidly so as to obtain a large refrigerating rate, over a relatively short period of time during peak loads.

Prior thermal reserve systems of either the submerged coil type or the overhead spray type have been found inadequate in numerous situations calling for a relatively high peak cooling load of short duration, because of the inability of these prior systems to melt the ice fast enough, and other reasons.

One of the principal features of the present invention is the very rapid melting of the ice by the high velocity impingement of large volumes of water against the surface of the ice. The action is somewhat comparable to the very rapid cutting or eroding of ice which can be performed by directing a high velocity stream of water from a garden hose against the ice surface. In my improved thermal reserve cooler, this high velocity impingement of large volumes of water against the surface of the ice is obtained by a unique arrangement of rotary spinner or slinger which centrifugally throws solid streams or slugs of water against the ice at high velocity. The ice is in the form of a vertically extending hollow cylinder, frozen upon vertically extending helical refrigerated coils. The rotary water spinner is disposed axially of this hollow cylinder of ice. One of the features of my improved construction is that the rotary spinner centrifugally projects the water against the inner surface of the cylindrical ice field or block at a multiplicity of vertically spaced levels, so that the high velocity erosion and the melting of the ice occurs substantially uniformly down along the entire vertical dimension of the ice block. This assists in a more rapid melting of the ice.

In the ice making part of the cycle, the ice is formed by spraying water against the helical refrigerating coils over a substantial time interval. Because of the substantially longer time interval that can be devoted to freezing the thermal reserve block of ice, the refrigerating equipment can be of relatively small capacity.

One of the features of my improved apparatus is the provision of a rotary spinner or slinger which can spray the water against the refrigerating coils during the freezing part of the cycle, as well as spray the water against the thermal reserve ice field on these coils in the melting part of the cycle. My improved rotary spinner is characterized by the provision of unique jets which can be made to project an atomized or relatively fine spray of water during the freezing part of the cycle, and which can be made to project substantially solid slugs of water during the melting part of the cycle. This differential type of operation is obtained by having the jets pass a relatively large volume of atomizing air along with the water for atomizing the water into a spray during the freezing part of the cycle, and by arranging these jets to pass substantially all water and very little or no air so as to project solid slugs of water during the melting part of the cycle.

The rotary spinner is in the form of a substantially vertical hollow tube, with provision for admitting water into each end of the tube. Under the rotary motion of the tube, the entering water is centrifuged outwardly against the inner wall of the tube, where it forms an annulus of water in the form of a lining pressing outwardly against the inner wall of the tube. This centrifugal annulus of water can be made to have a controllable depth and this depth may vary along the length of the tube, depending upon the volume of water introduced into the tubular spinner, and whether the water enters the spinner at the bottom end or the top end, etc. The above described jets are mounted in the wall of the tube, with their inner ends receiving water from the centrifugal annulus of water for outward centrifugal projection through the jets. A substantial depth of water in the centrifugal annulus will completely submerge the entrance openings of the jets so that they will project substantially solid slugs of water, which is an ideal condition for ice melting. On the other hand, a lesser depth of water in the centrifugal annulus will not completely submerge the jets but will permit substantial quantities of air to be whirled out through the jets along with the diminished volume of water, so that the air tends to break up or atomize the discharge of water, substantially in the form of a fine spray, which is an ideal condition for quick freezing.

In the ice melting part of the operating cycle, the water dropping down from the melting ice is collected in a tank below the refrigerating coils, from whence this ice water is circulated out to the point of cooling, which may consist of a flow through heat transfer coils, or a spray discharge down over milk cans, or any other cooling arrangement. In the preferred cycle or average installation, this same water, now at a substantially higher temperature, will be returned back to the thermal reserve cooler in the form of return water. A further feature of my invention is the introduction of this return water into the top of the tubular spinner in such manner that the kinetic energy in the return water is utilized advantageously to assist or compel rotary motion of the spinner or rotary motion of the centrifugal annulus of water lining the spinner. Another feature is the manner in which this return water is utilized to control or limit the up-flow of ice water from the pan into the lower end of the tubular spinner so as to prevent or control such recirculation of pan water through the tubular spinner during the ice melting part of the cycle.

Another feature of the invention resides in the provision of an emergency check valve which is associated with the tubular spinner and is made centrifugally responsive so that if there should be a failure of the electric motor which drives the rotary spinner, the return water returning from the heat exchange apparatus could be made effective to rotate the tubular spinner at a sufficient speed to melt the ice at a rate which might be lower than the motor driven rate of the spinner, but which would be adequate to effect a satisfactory melting of the ice during an emergency interval. Frequently, the commodity to be cooled may be of a very perishable nature, and a complete motor break-down just at the start of the cooling operation might mean the loss of the entire quantity of commodity or the inability to process it within a fixed time interval. The above described emergency check valve enables the tubular spinner to be revolved at a speed adequate to melt the ice during such an emergency situation, even though the rate of melting would not equal that obtainable by a motor driven operation of the spinner.

Other objects, features and advantages of the invention will be apparent from the following detail description of certain preferred embodiments of the invention. In the accompanying drawings illustrating such embodiments:

Figure 1 is a diagram of the entire system, showing the thermal reserve water cooler, and also showing the cooling circuit through which ice water is circulated from the collecting tank beneath the refrigerating coils, through the heat exchange apparatus and thence back to the top of the tubular spinner for projection against the ice field;

Figure 2 is a vertical sectional diagram in perspective showing the rotary spinner projecting water in the form of atomized or broken up sprays during the ice freezing part of the cycle;

Figure 3 is a view similar to Figure 2 showing the tubular spinner projecting substantially solid slugs of water against the ice field in the ice melting part of the cycle;

Figure 4 is a fragmentary detail view on a larger scale showing the action of the jets during the ice freezing part of the cycle;

Figure 5 is a similar view showing the action of the jets during the ice melting part of the cycle;

Figure 6 is a horizontal sectional view taken approximately on the plane of the line 6—6 of Figure 1, showing the tangential entrance of the return water to the spinner;

Figure 7 is a detail sectional view of the automatic check valve which I may use in the lower end of the spinner;

Figure 8 is a diagram showing a multistage modification of my invention adapted for series or parallel operation;

Figure 9 is a detail sectional view on a smaller scale, taken on the plane of the line 9—9 of Figure 8; and Figure 10 is a diagrammatic sectional view of another modified embodiment arranged for cooling air.

Referring first to the illustration of the entire system, shown in Figure 1, the thermal reserve water cooler is indicated in its entirety at 20, and the cooling apparatus where the heat exchange takes place is diagrammatically indicated in its entirety at 21. The water from the melting ice is taken from the tank 22 of the thermal reserve unit 20 and is conducted through a circulating pipe 23 to the cooling unit 21. After this water has performed its cooling function in the cooling unit 21, it is conducted through return pipe 24 to the upper end of the rotary spinner 25 in the thermal reserve unit 21. Any suitable circulating pump 26, such as a centrifugal pump driven by an electric motor 26a, is interposed at a suitable point in the circulating system, such as in the circulating pipe 23. A manually operated control valve 27 is also interposed in the circulating pipe 23, such as between the pump 26 and the cooling unit 21. It will be understood that the cooling unit 21 may consist of any type of device, apparatus or system for utilizing the cooled water from the thermal reserve unit 20 in the performance of a cooling function. For example, it may consist of a milk can cooler of the type which sprays water or sluices water over the milk cans; or it may consist of an "in-can" type of cooler utilizing a cooling coil which is inserted into the milk can; or it may consist of air cooling sprays in an air conditioning system, etc.

The thermal reserve cooler 20 is enclosed in a suitable thermally insulating housing 30 having a removable upper cover 31. The water collecting tank or pan 22 is formed in the lower part of this housing 30. The freezing coils, indicated collectively at 32, are in helical form and are disposed vertically, so that ice freezing thereon will be in the form of a substantially vertical hollow cylinder, as indicated at 33 in Figure 3. I have only shown two vertical banks or tiers of these coils 32, but it will be understood that a greater number of tiers may be employed, if desired. The coils may be connected to operate as a flooded refrigerating system or as a thermal valve system, using ammonia, Freon, or other refrigerant supplied from a refrigerating plant of any desired type. A typical refrigerating plant is schematically represented in Figure 1 by the electric motor 34 arranged to drive the refrigerant compressor 34a, which is connected to a condenser and to the freezing coils 32 in any preferred manner well known in the refrigerating field. Surrounding the upper turns of the outer coil 32" is a cylindrical sheet metal water baffle 35. During the early stages of the freezing operation before any substantial mass of ice has accumulated on the coils, this surrounding baffle serves to confine the water discharge from the spinner jets so that the water does not pass entirely through the coils, but strikes the baffle and splashes against the coils.

The water collecting tank 22 is constructed to hold a sufficient quantity of water to make up the desired ice field 33 on the coils 32. The total thickness or size of this ice field may be automatically predetermined by establishing a predetermined height or volume of water in the tank 22 which can be picked up by the rotary spinner 25. After the water in the tank has fallen to a predetermined lower level where it cannot be picked up effectively by the spinner, the ice making operation is caused to cease automatically. The top or maximum level of this predetermined quantity of ice-making water is established by a calibrated height of overflow pipe 36, which discharges through an overflow drain pipe 37 and has an atmospheric vent pipe 38. The overflow pipe 36 can be substituted by a longer or shorter section of pipe to raise or lower the predetermined upper water level for increasing or decreasing the thickness of the final ice field 33. When the ice-making water in the tank 22 is depleted to the predetermined lower level, an automatic float switch 39 shuts off the spinner and the refrigerating system, as will later appear. As previously described, during the ice melting part of the cyle the ice water collecting in the tank 22 is discharged from the tank through pipe 23 and is conducted to the cooling unit 21, from whence it is circulated back as return water to the upper end of the rotary spinner 25 (Figure 3).

The spinner 25 is mounted to extend down axially of the freezing coils 32, and to have its lower end submerged in the reserve water contained within the tank 22. The spinner is driven by an electric motor 44 which has vertical support in an end pedestal mount 45 secured to the housing cover 31. The motor shaft 46 has torque transmitting connection through a suitable coupling 47 with the axial shaft 50 of the rotary spinner. This spinner shaft has its upper end carried by one race of an antifriction thrust bearing 52, the other race of which is supported by the cover 31. As previously described, the spinner 25 is preferably in the form of a tube, and the supporting shaft 50 has mounted thereon hubs 54 from which radiate spokes or pins 55 that are secured to the tube 25.

Opening into the upper end of the rotary spinner is a return water inlet which comprises a water direction tube 57 that has its upper end secured to the under side of the cover 31 and has its lower end extending down into the open top of the tubular spinner. Opening into the side of the directing tube 57 is a return water conduit 59 which extends up through the cover 31 and has connection with the return pipe 24 leading back from the cooling unit 21. The conduit 59 opens into the directing tube 57 through a port 61 which is disposed more or less tangentially with respect to the tube 57, so that the velocity of the return water entering the directing tube 57 through port 61 tends to set up a rotary motion in the return water as it descends down through the directing tube 57. The direction of this rotary motion corresponds to the direction of rotary motion imparted to the spinner 25 by the motor 44. In this manner, the kinetic energy remaining in the return water is utilized advantageously to assist in driving the spinner, and also to help maintain the centrifugal annulus of water lining the spinner.

The lower end of the spinner shaft 50 extends down into a stationary bearing sleeve 62 which may be secured to the bottom wall of the tank 22 if desired. On the other hand, suitable stay-bolts and rods may be extended down from a removable top cover plate to a bottom bearing plate carrying the bearing sleeve 62, as will be later described in connection with Figure 10. The bearing sleeve 62 is preferably provided with a rubber liner 63 having a relatively free bearing fit over the lower end of the shaft, or any other preferred type of marine or submerged bearing may be employed. As hereinafter described, a centrifugal annulus of water A substantially lines the interior of the rotary spinner in both the ice-making and the ice-melting phases of the cycle. This annulus of water aids in producing a true valance of the spinner, so that the water annulus effects an automatic dynamic balancing action on the spinner, which minimizes vibration, bearing wear, etc.

Referring now to the above described jets 65 which perform the selective control operations of (1) projecting an atomized or relatively fine spray of water during the freezing part of the cycle, and (2) projecting substantially solid slugs of water during the melting part of the cycle, these jets 65 are fixedly anchored in apertures 66 in the wall of the tubular spinner, and are preferably arranged in a helical sequence or other desired pattern around the spinner, so as to secure a substantially uniform or predetermined distribution of the projected water against the freezing coils 32 or against the ice bank 33 during the rotation of the spinner. These jets 65 comprise shouldered outer heads 67 which abut against the outer side of the wall of the spinner, and swaged or shouldered inner shanks of varying lengths 68a, 68b, 68c, etc. extending inwardly from the inner side of the spinner wall. It will be noted that, at the upper end of the rotary spinner, each jet has a relatively short inner shank 68a which only projects inwardly a short distance from the surface of the spinner wall (or which might terminate flush with the wall) corresponding to a relatively shallow depth of the water annulus A held centrifugally against the wall near the upper end of the spinner tube. Progressing down along the series of jets toward the bottom of the spinner, the lengths of these projecting inner shanks continue to increase, as indicated at 68b and 68c, corresponding to progressively greater depths of the centrifugal water annulus A at progressively lower points in the spinner. This compensates for the parabola of equalization of the water annulus A when the water is being drawn up through the lower end of the spinner tube, and insures a more uniform distribution of the water from the several jets, as will be later described.

The bores 70 of these jets 65 are relatively large, and, as will be seen from a comparison between Figures 2 and 3, when the water annulus A is relatively shallow, so that it merely spills or trickles into the jets, then a relatively large volume of air is also whirled outwardly through the centers of the jets for exerting an atomizing action on the discharged water, tending to break it up into a fine spray or mist, in ideal condition for quick freezing on the coils 32 or ice bank 33. On the other hand, when the water annulus A is relatively deep, as shown in Figure 3, so that it completely submerges the inlet openings 69 of the jets, then the discharge through each jet consists of a solid water stream or substantially solid slugs of water, having maximum effectiveness for rapidly eroding and melting the ice bank 33.

The water annulus A is made up of water either sucked upwardly from the lower end of the spinner or fed downwardly into the top end of the spinner, or both. Water spinning freely inside a rotating vertical cylinder which is restricted or confined at the bottom end will form a parabola of equalization extending upwardly along the inner wall of the cylinder. For a given speed of rotation, the height that this parabolic annulus A will climb in the cylinder will depend upon the ratio of the diameter of the lower constriction to the inside diameter of the cylinder, i. e. the radial proportionality existing between the inlet diameter and the centrifuging diameter. The greater the difference between these two diameters the higher will the water climb in arriving at the parabola of equalization. This lower constriction at the bottom end of the spinner tube consists of an apertured disk or ring 71 secured in the lower end of the tube so as to produce a constricted inlet diameter D. As previously described, this lower end of the spinner tube is submerged below the normal water level L in the pan or tank 22.

Further up the tube, preferably at a point just below the lowermost jet 65, is another apertured disk or ring 72 having an aperture diameter D' which is slightly larger than the aperture diameter D of the bottom ring 71. This second or intermediate ring 72 serves to limit or restrict upward flow of the pan water, particularly during the ice melting operation, at which time it is desirable to prevent or restrict any substantial quantity of the relatively cold pan water moving upwardly to the height of the jets and mixing with the relatively warm return water coming down into the top of the spinner through water return inlet 59. The gravitational head of this warm return water moving down in the spinner tube substantially blocks upward flow of the relatively cold pan water approximately at the intermediate ring 72. In order to distinguish between the upwardly flowing pan water and the downwardly flowing return water, particularly in Figure 3, I have shown the pan water by dash and dot lines, and have shown the overhead return water by dotted lines.

In certain multi-stage embodiments of the invention which I shall later describe, all of the water utilized in melting the ice bank of the second stage enters the lower end of the second stage spinner, and in such situation this intermediate ring 72 is preferably omitted from that spinner.

At the upper end of the spinner tube a top ring 73 is preferably provided, having an aperture diameter D'' larger than the aperture diameters D and D' of the lower and intermediate rings. This top ring insures that the water annulus A will be of sufficient depth at the top of the spinner to produce an effective discharge through the upper jets 65. The open top of the spinner tube, above the top ring 73, affords an overflow outlet which can immediately discharge any excess return water which may be entering the upper end of the spinner tube from the warm water return inlet 59 during the ice melting operation. That is to say, if an exceptionally large quantity of return water is entering the upper end of the spinner tube, beyond the combined capacity of the jets to discharge, the excess water does not drop down into the bottom of the tube but instead flows up and out through the top ring 73 for centrifugal discharge against the top portion of the ice bank 33. This top discharge of excess return water occurs automatically by virtue of the provision of the intermediate ring 72, and the ratio of the diameters D' and D''. It will be noted that the three progressively larger diameters D, D' and D'' define the approximate outline of an inverted cone or frustum of a cone, and the spinner can be made of a cone if desired, but the use of cylindrical tube with the rings 71, 72 etc. mounted therein is decidedly preferable, because the cylindrical tube is a stock item, it can be more easily balanced both statically and dynamically, and a more accurate control of the upper and lower water flows can be obtained by the use of the rings.

The operation of this single stage embodiment shown in Figures 1, 2 and 3 will be apparent from the preceding description. During the ice making phase of the operation, shown in Figure 2, the rotary motion of the spinner lifts water up from the tank and discharges it through all of the jets 65 in finely atomized form, each jet projecting a thin peripheral sheath or discharge of water either surrounding or in immediate proximity to a stream of air also discharged through the jet. The result is a finely atomized spray or mist, in ideal condition for freezing upon the freezing coils 32. Whatever spray is projected through the coils strikes the surrounding outer baffle 35. All water precipitated down from the baffle or from the freezing coils is collected in the tank 22 and is eventually recirculated back up through the rotary spinner for repeated projection against the freezing coils, and against the ice bank 33 gradually accumulating thereon. This ice-making phase of the complete cycle may be extended over a considerable period of time, depending upon the requirements of the cooling cycle, the capacity of the refrigerating plant supplying refrigerant to the coils 32, and other factors. In milk cooling installations for dairies and the like, the ice-making phase of the operation may be extended to periods of 8 or 10 hours or more, followed by an ice-making phase of possibly 1 to 2 hours duration, so that the complete cycle can be repeated twice a day for two batches of milk a day. It will be understood that these time intervals are merely illustrative. The ice-making phase of the cycle can be interrupted at any time by shutting down the operation of the rotary spinner either manually or automatically. Also, as previously described, another automatic method of interrupting the ice-making operation is to provide a fixed predetermined quantity of water in the tank 22, which becomes gradually depleated as the water freezes on the ice bank 33. When the level of the water remaining in the tank approaches the lower edge of the spinner, the lowering of float 39a of float switch 39 opens the switch contacts 39b to de-energize a three pole control relay 40. This relay comprises two normally open pairs of contacts 41 and 42 and a normally closed pair of contacts 43. The opening of the contacts 41 and 42 upon de-energization of the relay stops the motor 44 driving the spinner and also stops the compressor motor 34 of the refrigerator, unless it is desired to have the compressor continue to operate after completion of the ice field. The contacts 43 control the circuit to the electromagnetically operated water valve 74 which governs the flow of make-up water into the tank 22.

To start the ice-melting phase of the cycle, the circulating pump 26 is set into operation by closing the manual switch 26b of the pump motor 26a, and the valve 27 is opened. If water has been lost from the system (i. e. in the case of plate milk coolers, etc.) then make-up water is added to the tank 22 through the electrically controlled water make-up valve 74 so as to bring the level up to the point where the float 39a of the float switch 39 will rise and energize the relay 40 and start the spinner motor 44 and the compressor motor 34 (if it is desired that the latter operate at this time). The operation of the pump 26 pumps water from the tank 22 through the heat exchange device 21 and thence back to the return water inlet 59 discharging tangentially into the upper end of the rotating spinner 25. This warmed return water establishes a relatively deep centrifugal annulus of water A extending all the way down in the spinner to the intermediate ring 72 and completely submerging all of the shanks 68a, 68b, 68c of all of the jets. Hence, all of the jets project solid streams of this warmer return water against the ice bank for rapid erosion and melting of the ice. The impingement of the water against the ice, of course, cools the water, and the combined precipitation of melting ice water and cooled return water drops down into the pan 22, from whence it is recirculated out to the heat exchange device 21 and thence back to the water return inlet 59 for discharging back into the upper end of the spinner.

In Figure 7 I have illustrated an emergency check valve 75 which can optionally be provided at the lower end of the spinning tube if desired, to take care of emergency situations where there is a failure of the electric motor 44 or its immediate source of current supply, occurring either at the start of or during the ice melting operation. It will be understood that the present apparatus will often be used for cooling commodities of a highly perishable nature, or in situations where the failure to complete a cooling operation within a given time can result in a large monetary loss. To insure some degree of operation of the spinner 25 under the impetus of the return water in the ice melting phase, notwithstanding a failure of the electric motor 44, I provide the centrifugally operated emergency check valve 75 directly above the bottom ring 71 of the spinner. This device is centrifugally responsive so as to keep the opening D in the ring 71 wide open while the spinner is being driven at high speed by the electric motor, but when the spinner is not being driven by the electric motor the device restricts this opening to prevent the return water entering the top of the spinner from dropping out through the bottom of the spinner. The device comprises a check valve disk 77 provided with a central hole 78 having a free sliding fit over the spinner shaft 50, and having an outer peripheral edge adapted to rest on the top of the bottom ring 71 for very substantially restricting downward flow through opening D. A mounting collar 79 is secured fast to the spinner shaft, as by a set screw or pin, and chains or like flexible members 81 extend from points of attachment on the mounting collar 79 to points of attachment on the disk 77. These chains are of sufficient length to permit the disk 77 to seat on the bottom ring 71 when the chains are not being whirled out centrifugally. Each chain is provided with a centrifugal weight 83 substantially at its mid-point, or the chains might be conceivably of sufficient weight themselves to have the requisite centrifugal response for raising and holding the check valve disk 77 in its open position when the spinner 25 is motor driven. When the spinner is not motor driven, the check valve disk drops down into its closed position, so the return water entering the top of the spinner through the return water inlet 59 will not drop down through the bottom of the spinner. The velocity energy of this return water entering the top of the spinner tube tangentially will usually be sufficient to rotate the spinner at about 200 R. P. M. or so, and this is sufficient to give a fairly effective distribution of water through the jets 65 for performing an ice melting operation. The ice melting operation under these emergency conditions will of course be considerably slower than when the spinner is motor driven, but may be up around 50% or 60% capacity, depending upon the velocity of the return water.

The spinner is preferably directly connected to the motor to run at motor speed, which is usually about 1750 R. P. M. In a typical or average size of unit, this means that in the ice-melting operation the warm return water will be thrown against the ice field 33 at velocities as high as 2500 feet per minute or higher, causing a rapid melting and erosion of the ice. Infinitesimal ice particles thus eroded from the ice field will flow through the pump, absorbing heat en route. The warm return water, regardless of volume ranging anywhere from 5 to 200 gallons per minute, will be uniformly sprayed over the ice field. Even when the spinner is self-propelled by the velocity energy of this return water, it is still effective to throw the warm return water against the ice field with considerable velocity. This high velocity impingement is an extremely important factor in obtaining rapid melting of the ice. The extrusion length or distance that each jet 65 projects outwardly from the spinner also is a factor in determining the velocity of impingement. Furthermore, the internal diameter D" of the top ring 73 controls the thickness of the water annulus in the spinner and thus the pressure in the jets, and can be proportioned to increase the pressure if desired. This will be better understood from the statement that ¼ inch thickness of centrifugal annulus of water in a typical size of spinner at approximately 1150 R. P. M. will give the equivalent of a static head on the jets of 20 to 30 feet.

In Figure 8 I have illustrated a multiple-unit embodiment of my invention comprising a plurality of units, each having an individual rotary spinner operating within an individual set of freezing coils. The construction of this modified embodiment is such that these separate units can be connected to operate either in series or in parallel during the ice melting operation. A multiple-stage series operation is sometimes desirable for effecting a temperature reduction over a wide range or span of temperature, as for example, where the temperature of the return water or circulating water to be cooled has an entering temperature of say from 100° to 200° F., and it is desired to reduce this temperature down close to the freezing point. On the other hand, a parallel operation of the multiple units is sometimes advantageous when it is desired to handle a larger volume of return water than can be adequately handled by a single unit. In this modified embodiment I have shown two thermal reserve units A and B arranged for either series or parallel operation, but it will be understood that this number may be increased to three or more, if desired. The housing 30 is made sufficiently large to accommodate the plurality of units. The rotary spinner 25A of the first stage is provided with its individual set of freezing coils 32A, and the rotary spinner 25B of the second stage is likewise provided with its individual set of freezing coils 32B. The lower portion of the housing is divided into two tanks 22A and 22B by a transverse baffle 85. This baffle is of predetermined height to predetermine the maximum height of the water in the tank 22A. Formed centrally in the lower part of the baffle 85 is an opening 86 from which extends a transfer channel 87 terminating in an upwardly extending well 88 into which the lower end of the second stage spinner 25B extends. When the two stages are being operated in series in the ice melting operation, all of the water which is supplied to the second-stage spinner 25B for melting the ice field on the second-stage coils 32B is conducted from the lower part of the first-stage tank 22A through transfer channel 87 and upwardly through the well 88 into the lower end of the spinner 25B. The return water which is returned from the heat exchange cooling unit 21 enters the top of the first stage rotary spinner 25A through the tangentially directed inlet connection 59, in the same manner described of the preceding embodiment. This water is whirled centrifugally against the ice field in the first stage of the apparatus, so that the water collecting in the pan 22A has had its temperature reduced through a first stage of cooling. This water is then conducted through the transfer channel 87 and is picked up by the second-stage spinner 25B, from whence it is whirled centrifugally against the ice field in the second stage of the apparatus. The water precipitated down from the ice field into the second-stage tank 22B has had its temperature brought down through a second stage of cooling, and this may be repeated through other stages, if desired. The outflow of cooled water occurs through circulating pipe 23 and circulating pump 26 to the heat exchange unit 21 and thence back to the first stage of the thermal reserve apparatus. By this multiple-stage arrangement it is entirely practicable to effect a temperature reduction from a top temperature of approximately 150° or even more, down to a low temperature approximating 32° F.

With reference to the ice making part of the cycle, the supply of water to the two tanks 22A and 22B, or the control of the upper liquid level therein, may be effected manually; or each tank 22A and 22B may be provided with a calibrated over-flow pipe 36 and with a float switch control 39—40.

If it is desired to be able to operate stages A and B in parallel, another branch 24B of the return pipe 24 is extended over to a return water inlet 59B entering the top of the second stage spinner 25B. The opening of the valve 91 in this branch pipe 24B enables the two stages to be operated in parallel.

I also contemplate another multi-stage embodiment of my invention in which the series sequence of the stages would be interchangeable or reversible. In this embodiment the two tanks 22A and 22B would be separated by the transverse partition 85, but transfer channels 87A and 87B would extend in each direction from the partition opening 86 and would terminate in end wells 88A and 88B for the lower ends of the two rotary spinners 25A and 25B. Each rotary spinner would have an individual return water inlet 59A and 59B. The series staging could be from unit A to unit B by having the return water enter spinner 25A, or the series staging could be reversed in a direction from unit B to unit A by having the return water enter the other spinner 25B.

In Figure 10 I have illustrated a modified embodiment of my invention in which the thermal reserve unit is employed to cool a stream of air, and in which the thermal transfer operation occurs directly within the thermal reserve unit. In this embodiment an air inlet duct 91 opens through the top of the housing 30 and directs the entering air down into the upper end of the annular space 92 which is defined between the rotary spinner 25 and the ice field 33. This air passes down around the lower edge of the ice field 33 and thence passes upwardly and out of the unit 20 through a substantially vertical discharge passageway or duct 93 in which are disposed a suitable arrangement of eliminator baffles 94. It will be seen that this path of the air causes it to pass transversely through all of the whirling sheets or disks of water spray which are being whirled out from the jets 65 of the spinner in the ice melting phase of the cycle. This melting ice water is close to the freezing temperature at this time, and hence it effects a sharp cooling of the air. Furthermore, the air has direct and intimate contact with the ice field 33 at this time, which exerts an additional cooling effect on the air. Hence, practically all entrained moisture in the air is precipitated, so that a desirable degree of dehumidification occurs along with the temperature reduction. The eliminator baffles 94 aid in eliminating from the air such condensed moisture as has not been separated out by the cold water sprays from the spinner and the contact with the ice field. The housing 30 in this embodiment is preferably well insulated. In the ice-making phase of the cycle, the ice-making water consists of tank water lifted from the tank 22 by the spinner 25 in the same manner previously described. In the ice-melting phase of the cycle, the water to be cooled or the ice-melting water also preferably consists of tank water lifted from the tank 22 by the spinner 25. In this air cooling embodiment of the invention, the jets 65 are so proportioned with respect to orifice opening, length of shank 68, etc. as to produce a highly atomized spray discharge during both the ice-making and ice-melting phases of the cycle. The atomized spray discharge during the air cooling (ice-melting) phase of the cycle increases the adiabatic efficiency of the device as an air cooling unit, because in spray types of air cooling apparatus the fineness of the water spray is one important factor in determining the efficiency of the apparatus.

In this embodiment, I have shown the lower bearing 62 for the spinner shaft as being mounted in a bearing plate 97 which is suspended between two diametrically opposite hanger or stay bolts 98 secured to the plate by nuts 99. The upper ends of these bolts are secured to a removable cover 31a which preferably has resilient mounting in the main cover 31. The removable cover 31a also carries the electric motor 44, so that the entire motor and spinner assembly can be readily removed as a unit from the cover 31 for inspection or repair. This same removable unit feature can also be incorporated in the previously described embodiments of Figures 1–7 and 8–9.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a thermal reserve cooler having an operating cycle comprising ice-making and ice-melting phases, the combination of a substantially vertical cylindrical refrigerating coil defining a cylindrical freezing surface, a tank below said coil for collecting water, a rotary spinner disposed substantially axially of said coil, said spinner comprising a substantially cylindrical tube, jets opening outwardly from said tube at spaced points along its length, an inlet opening in the lower end of said spinner adapted to be submerged in the water in said tank for enabling tank water to be lifted centrifugally from said tank upwardly into said spinner to a height above the water level in said tank for outward projection through said jets during the ice-making phase of the cycle, means for feeding water-to-be-cooled into the upper end of said spinner for outward projection through said jets during the ice-melting phase of the cycle, and means mounted within said rotary spinner for limiting or restricting upward flow of the tank water in the spinner when water to be cooled is introduced into the upper end of said spinner.

2. In a thermal reserve cooler having an operating cycle comprising ice-making and ice-melting phases, the combination of a substantially vertical refrigerating coil, a tank for collecting water below said coil, a rotary spinner disposed substantially axially of said coil, said spinner comprising a substantially cylindrical tube having an open lower end adapted to be submerged in the water in said tank so that the rotary motion of said spinner tends to lift a parabolic annulus of water from said tank upwardly in said spinner tube, jets opening outwardly from said tube at spaced points along its length for centrifugally projecting water from the inside of said tube, and a ring in said spinner tube below the water level in said tank for gravitationally supporting said parabolic annulus of water of substantial radial depth extending upwardly in said tube along its inner wall, one or more of said jets having an inner shank projecting inwardly from said inner wall a substantial distance so as to require a substantial depth of the centrifugal annulus of water at the location of the jet in order to completely submerge the inlet end of the jet.

3. In a thermal reserve cooler having an operating cycle comprising ice-making and ice-melting phases, the combination of a substantially vertical refrigerating coil, a tank for collecting water below said coil, a rotary spinner disposed substantially axially of said coil, said spinner comprising a substantially cylindrical tube having a restricted lower end immersed in water in said tank, means for driving said spinner tube at a relatively high velocity to lift a centrifugal annulus of water from said tank into said tube, means for feeding water into the upper end of said spinner tube, and jets opening outwardly from said tube at spaced points along its length for centrifugally projecting water outwardly from the inside of said tube, a plurality of said jets having orifices spaced radially inwardly from the inner wall of said spinner tube to discharge air along with the water in the ice-making phase of the cycle so as to produce an atomizing action for more rapid freezing of the water.

4. In a thermal reserve cooler having an operating cycle comprising ice-making and ice-melting phases, the combination of a refrigerating coil, a water collecting tank below said coil, a rotary spinner disposed substantially axially of said coil, said spinner comprising a substantially cylindrical tube having a restricted opening in its lower end submerged below the water level in said tank, means for driving said spinner tube at a velocity of at least 500 R. P. M. to effect a centrifugal lift of water from said tank into said tube during the ice-making phase of the cycle, jets opening outwardly from said tube at spaced points along its length for centrifugally projecting water from within said tube, and means for feeding water to be cooled into the upper end of said tube during the ice-melting phase of the cycle for substantially flooding said jets to discharge substantially solid streams of water, with little or no atomizing air, during the ice-melting phase of the cycle.

5. In a thermal reserve cooler having an operating cycle comprising ice-making and ice-melting phases, the combination of a substantially cylindrical freezing surface, a water holding tank below said freezing surface, a rotary spinner disposed substantially axially of said freezing surface, said spinner comprising a longitudinal tube having its lower end submerged below the water level in said tank, means for rotating said tube at a relatively high speed tending to lift a centrifugal annulus of water therein extending longitudinally along the inner wall of said tube, means for supplying water into the upper end of said tube, jets in said spinner opening outwardly therefrom and fed from said centrifugal annulus of water, and vertically spaced control orifices in said tube comprising a first orifice which is below the water level in said tank, and a second orifice intermediate the ends of said tube, one of said orifices being of smaller diameter than the other for controlling said water annulus whereby to cause said jets to discharge substantially solid streams of water during the ice-melting phase of the cycle.

6. In a thermal reserve cooler having an operating cycle comprising ice-making and ice-melting phases, the combination of a substantially vertical cylindrical refrigerating coil, a tank below said coil for collecting water, a rotary spinner disposed substantially axially of said coil, said spinner comprising a substantially cylindrical tube having its lower end submerged below the water level in said tank, jets opening outwardly from said tube at spaced points along its length for centrifugally projecting water from within the tube, said spinner lifting water centrifugally from said tank for feeding said jets during the ice-making phase of the cycle, means for admitting water to be cooled into the upper end of said spinner tube during the ice-melting phase of the cycle, a lower ring in the lower end of said tube below the water level in said tank, and an intermediate ring in said tube below the lowermost jet, said intermediate ring having a larger orifice diameter than said lower ring, said intermediate ring permitting tank water to move upwardly to said jets in the ice-making phase of the cycle, but cooperating with the top admission water to prevent said tank water moving upwardly to said jets in the ice-melting phase of the cycle.

7. In a thermal reserve cooler having an operating cycle comprising ice-making and ice-melting phases, the combination of a substantially cylindrical freezing coil, a water collecting tank below said coil, a rotary spinner disposed substantially axially of said coil, said spinner comprising a longitudinal tube having its lower end submerged below the water level in said tank, means for driving said spinner at a sufficient speed to cause said spinner tube to lift water centrifugally from said tank, jets opening outwardly from said tube at spaced points along its length, means for admitting water to be cooled into the upper end of the spinner during the ice-melting phase of the cycle, and an overflow discharge edge at the upper portion of the spinner operative to discharge excess water admitted into the upper end of the spinner beyond the capacity of the jets to discharge.

8. In a thermal reserve cooler, the combination of a substantially vertical rotary tubular spinner, a freezing surface substantially surrounding said spinner, a water collecting tank below said freezing surface, the lower end of said spinner being submerged below the water level in said tank, an electric motor for driving said tubular spinner at a sufficient speed to enable it to lift water centrifugally from said tank, water projecting jets located at vertically spaced points along the length of said spinner, and upper inlet means for admitting water into the upper end of said spinner in a substantially tangential direction so that the velocity energy of such entering water will impart rotative impetus to said spinner in the same direction that it is driven by said electric motor.

9. In a thermal reserve cooler, the combination of a rotary tubular spinner, a freezing surface adjacent thereto, a water tank below said freezing surface, the lower end of said tubular spinner being submerged below the water level in said tank for centrifugally lifting water from said tank, water projecting means at spaced points along said spinner operative to project water against said freezing surface to freeze a thermal reserve ice field thereon, and means predetermining the total amount of water in said tank at the start of the ice-making operation for automatically controlling the thickness of said thermal reserve ice field by controlling the total amount of water supplied to said spinner in the ice-making operation.

10. In a thermal reserve water cooling system having an operating cycle comprising ice-freezing and ice-melting phases, the combination of a rotary tubular spinner, a freezing surface adjacent thereto, water projecting jets carried by said spinner operative to centrifugally project ice-making water against said freezing surface to build an ice field thereon in the ice-freezing phase, and operative to centrifugally project water to be cooled against said ice field in the ice-melting phase, a tank below said freezing surface for collecting the melting ice water in the ice-melting phase, the water level in said tank submerging the lower end of said tubular spinner in one operating phase of said system, top admission means for supplying water to the top of said spinner, thermal transfer apparatus and means for circulating water from said tank to said thermal transfer apparatus and thence back to said rotary spinner through said top admission means.

11. In a multiple-stage thermal reserve water cooler, the combination of a first freezing coil and a first rotary spinner therein, a second freezing coil and a second rotary spinner therein, each of said spinners comprising jet means for projecting water against its respective freezing coil for freezing an ice field thereon in an ice-making phase of the cycle, inlet means for supplying water to be cooled to the upper end of said first spinner during the ice-melting phase of the cycle for projection against the ice field on said first coil for a first stage of cooling, a tank below said first coil for receiving water therefrom after said first stage of cooling, means for transferring water from said tank at a point below said second spinner, said second spinner having its lower ends submerged in said water for centrifugally lifting said water and centrifugally projecting it against the ice field on said second coil for a second stage of cooling, and a tank below said second coil for receiving the water after said second stage of cooling.

12. In a multiple-unit thermal reserve water cooler, the combination of a first freezing coil and a first rotary spinner therein, a second freezing coil and a second rotary spinner therein, each of said spinners comprising jet means for centrifugally projecting water against its respective freezing coil for freezing an ice field thereon in the ice-making phase of the cycle, top admission means for admitting water to the top of one of said spinners, bottom admission means for admitting water to the bottom of the other of said spinners, and means operative during the ice-melting phase of the cycle to conduct water to be cooled through the two spinners in series by feeding it to the top admission means of one spinner and then to the bottom admission means of the other spinner.

13. In a thermal reserve water cooler having an operating cycle comprising ice-making and ice-melting phases and adapted to supply cooled water to a heat exchange device, the combination of a water collecting tank, a refrigerating coil in said tank forming a freezing surface, water emitting apparatus for emitting water against said refrigerating coil, said water emitting apparatus comprising water emitting apertures located at different vertically spaced levels between the bottom and top of said coil for emitting water against said coil at said different levels during the ice-making phase and during the ice-melting phase, said water emitting apparatus including an electric motor for supplying water emitting energy thereto, said water emitting apparatus drawing substantially all of its water from said tank during the ice-making phase, whereby that part of the emitted water which is not frozen upon contact with said refrigerating coil, or upon contact with ice previously frozen thereon, will drop back into said tank for recirculation by said water emitting apparatus into repeated contact with said refrigerating coil or the ice frozen thereon, control apparatus for automatically controlling the mass of the ice field frozen on said refrigerating coil comprising a top level overflow connection leading from said tank to establish the top level of a predetermined volume of water contained within said tank at the start of the ice-making operation, said top level overflow connection being disposed at a level substantially above the bottom of said refrigerating coil whereby a susbtantial number of the lower convolutions of said coil are submerged in the water at the start of the ice-making operation, float controlled switch means responsive to the water level in said tank and operatively connected to automatically interrupt the operation of said electric motor when the body of water in said tank falls to a predetermined low level, said predetermined low level being approximately at the bottom of said refrigerating coil, and automatically operating make-up water supply means operatively connected with said float controlled switch means for automatically adding make-up water to said tank.

14. In a thermal reserve water cooler having an operating cycle comprising ice-making and ice-melting phases and adapted to supply cooled water to a heat exchange device, the combination of a water collecting tank, a refrigerating coil in said tank forming a freezing surface, water emitting apparatus for emitting water against said refrigerating coil comprising vertically spaced water emitting apertures located within said coil at different levels and arranged to emit a substantial part of the water outwardly in a generally horizontal direction against different vertically spaced levels of said coil during the ice-making phase and during the ice-melting phase, said water emitting apparatus including an electric motor for supplying water emitting energy thereto, said water emitting apparatus drawing substantially all of its water from said tank during the ice-making phase, whereby that part of the emitted water which is not frozen upon contact with said refrigerating coil, or upon contact with ice previously frozen thereon, will drop back into said tank for recirculation by said water emitting apparatus into repeated contact with said refrigerating coil or the ice frozen thereon, control apparatus for automatically controlling the mass of the ice field frozen on said refrigerating coil comprising a top level overflow connection leading from said tank to establish the top level of a predetermined volume of water contained within said tank at the start of the ice-making operation, said top level overflow connection being disposed at a level substantially above the bottom of said refrigerating coil whereby a substantial number of the lower convolutions of said coil are submerged in the water at the start of the ice-making operation, float controlled switch means responsive to the water level in said tank and operatively connected to automatically interrupt the operation of said electric motor when the body of water in said tank falls to a predetermined low level, said predetermined low level being approximately at the bottom of said refrigerating coil, and means for adding make-up water to said tank at the start of the ice-making cycle.

15. In a thermal reserve water cooler having an operating cycle comprising ice-making and ice-melting phases and adapted to supply cooled water to a heat exchange device, the combination of a water collecting tank, a refrigerating coil in said tank forming a freezing surface, water emitting apparatus for emitting water against said refrigerating coil comprising vertically spaced water emitting apertures located within said coil and arranged to emit a substantial part of the water outwardly in a generally horizontal direction against different vertically spaced levels of said coil during the ice-making phase and during the ice-melting phase, said water emitting apparatus including an electric motor for supplying water emitting energy thereto, said water emitting apparatus drawing substantially all of its water from said tank during the ice-making phase, whereby that part of the emitted water which is not frozen upon contact with said refrigerating coil, or upon contact with ice previously frozen thereon, will drop back into said tank for recirculation by said water emitting apparatus into repeated contact with said refrigerating coil or the ice frozen thereon, control apparatus for automatically controlling the mass of the ice field frozen on said refrigerating coil comprising a top level overflow connection leading from said tank to establish the top level of a predetermined volume of water contained within said tank at the start of the ice-making operation, said top level overflow connection being disposed at a level substantially above the bottom of said refrigerating coil whereby a substantial number of the lower convolutions of said coil are submerged in the water at the start of the ice-making operation, and float controlled switch means responsive to the water level in said tank and operatively connected to automatically interrupt the operation of said electric motor when the body of water in said tank falls to a predetermined low level, said predetermined low level being approximately at the bottom of said refrigerating coil.

16. In a thermal reserve water cooler having an operating cycle comprising ice-making and ice-melting phases and adapted to supply cooled water to a heat exchange device, the combination of a water collecting tank, a refrigerating coil in said tank forming a freezing surface, water emitting apparatus for emitting water against said refrigerating coil, said water emitting apparatus comprising water emitting apertures located at different vertically spaced levels between the bottom and top of said coil for emitting water against said coil at said different levels during the ice-making phase and during the ice-melting phase, said water emitting apparatus including an electric motor for supplying water emitting energy thereto, said water emitting apparatus drawing substantially all of its water from said tank during the ice-making phase, whereby that part of the emitted water which is not frozen upon contact with said refrigerating coil, or upon contact with ice previously frozen thereon, will drop back into said tank for recirculation by said water emitting apparatus into repeated contact with said refrigerating coil or the ice frozen thereon, control apparatus for automatically controlling the mass of the ice field frozen on said refrigerating coil comprising a top level overflow connection leading from said tank to establish the top level of a predetermined volume of water contained within said tank at the start of the ice-making operation, said top level overflow connection being disposed at a level substantially above the bottom of said refrigerating coil whereby a substantial number of the lower convolutions of said coil are submerged in the water at the start of the ice-making operation, float controlled switch means responsive to the water level in said tank and operatively connected to automatically interrupt the operation of said electric motor when the body of water in said tank falls to a predetermined low level, said predetermined low level being approximately at the bottom of said refrigerating coil, a circulating pump for circulating water from said tank to said heat exchange device, an electric motor for operating said pump, an electrically controlled water make-up supply valve operative at the start of the ice-melting phase of the cycle to add make-up water to said tank if necessary so as to bring the water level therein up to the point where said float controlled switch means will be operated to energize said electric motor and cause said water emitting apparatus to emit water against the ice field on the refrigerating coil, and circuit connections for said electrically controlled supply valve which are connected with the electric motor which operates said circulating pump and which are also connected with said float controlled switch means, whereby said electrically controlled supply valve is opened when said circulating pump is started and remains open for admitting make-up water until said float controlled switch means is brought up to its high level control point.

17. In a thermal reserve cooler having an operating cycle comprising ice-making and ice-melting phases, the combination of a water collecting tank, a refrigerating coil in said tank forming a freezing surface, water emitting apparatus for emitting water against said refrigerating coil at different vertically spaced levels during the ice-making phase and during the ice-melting phase, and including an electric motor for supplying the water emitting energy thereto, said water emitting apparatus drawing substantially all of its water from said tank during the ice-making phase whereby that part of the emitted water which is not frozen upon contact with said refrigerating coil, or upon contact with ice previously frozen thereon, will be discharged into the tank for recirculation by said water emitting apparatus into repeated contact with said refrigerating coil or the ice frozen thereon, control apparatus for controlling the mass of the ice field frozen on said refrigerating coil comprising a top level control overflow pipe connected with said tank to establish the top level of a predetermined volume of water contained within said tank at the start of the ice-making operation, said predetermined top level submerging the lower portion of said refrigerating coil, float controlled switch means responsive to the water level in said tank and operatively connected to automatically interrupt the operation of said electric motor when the body of water in said tank falls to a predetermined low level, said predetermined low level being approximately at the bottom of said refrigerating coil, and means operative at the start of the ice-melting phase of the cycle to add make-up water to said tank if necessary so as to bring the water level therein up to the point where said float controlled switch means will be operated to energize said electric motor and cause said water emitting apparatus to emit water against the ice field on the refrigerating coil.

18. In a thermal reserve cooler having an operating cycle comprising ice-making and ice-melting phases, the combination of a water collecting tank, a refrigerating coil in said tank forming a freezing surface, water emitting apparatus for emitting water against said refrigerating coil at different vertically spaced levels during the ice-making phase and including an electric motor for supplying the water emitting energy thereto, said water emitting apparatus drawing its water from said tank during the ice-making phase whereby that part of the emitted water which is not frozen upon contact with said refrigerating coil, or upon contact with ice previously frozen thereon, will be discharged into the tank for recirculation by said water emitting apparatus into repeated contact with said refrigerating coil or the ice frozen thereon, control apparatus for controlling the mass of the ice field frozen on said refrigerating coil comprising a top level control overflow pipe connected with said tank to establish the top level of a predetermined volume of water contained within said tank at the start of the ice-making operation, said predetermined top level submerging the lower portion of said refrigerating coil, float controlled switch means responsive to the water level in said tank and operatively connected to automatically interrupt the operation of said electric motor when the body of water in said tank falls to a predetermined low level, said predetermined low level being approximately at the bottom of said refrigerating coil, an electrically controlled water make-up supply valve operative at the start of the ice-melting phase of the cycle to add make-up water to said tank if necessary so as to bring the water level therein up to the point where said float controlled switch means will be operated to energize said electric motor and cause said water emitting apparatus to emit water against the ice field on the refrigerating coil, and circuit connections for said electrically controlled supply valve responsive to said float controlled switch means whereby said supply valve can only be opened when said float controlled switch means is approximately in its low level position.

References Cited in the file of this patent

UNITED STATES PATENTS

| Number | Name | Date |
|---|---|---|
| 150,477 | Martin | May 5, 1874 |
| 936,065 | Whitaker | Oct. 5, 1909 |
| 1,020,759 | Holden | Mar. 19, 1912 |
| 1,283,017 | Zavarkin | Oct. 29, 1918 |
| 1,817,328 | Weimer | Aug. 4, 1931 |
| 1,855,848 | Watt et al. | Apr. 26, 1932 |
| 2,056,970 | Leopold | Oct. 13, 1936 |
| 2,080,639 | Taylor | May 18, 1937 |
| 2,337,783 | Thompson et al. | Dec. 28, 1943 |
| 2,380,901 | Chamberlain | July 31, 1945 |
| 2,421,293 | Shawhan | May 27, 1947 |
| 2,436,426 | Fish | Feb. 24, 1948 |
| 2,437,417 | Bookman | Mar. 9, 1948 |
| 2,448,453 | Morrison | Aug. 31, 1948 |
| 2,459,337 | Raney | Jan. 18, 1949 |
| 2,490,324 | Rigby | Dec. 6, 1949 |
| 2,495,878 | Tull | Jan. 31, 1950 |